US009830897B2

(12) United States Patent
Oh et al.

(10) Patent No.: US 9,830,897 B2
(45) Date of Patent: Nov. 28, 2017

(54) ELECTRONIC DEVICE AND METHOD FOR OUTPUTTING SOUNDS

(71) Applicant: Samsung Electronics Co., Ltd., Gyeonggi-do (KR)

(72) Inventors: Hae-Seok Oh, Gyeongsangbuk-do (KR); Chul-Hyung Yang, Gyeongsangbuk-do (KR); Gyu-Cheol Choi, Gyeongsangbuk-do (KR)

(73) Assignee: Samsung Electronics Co., Ltd (KR)

(*) Notice: Subject to any disclaimer, the term of this patent is extended or adjusted under 35 U.S.C. 154(b) by 452 days.

(21) Appl. No.: 14/533,791

(22) Filed: Nov. 5, 2014

(65) Prior Publication Data

US 2015/0127128 A1 May 7, 2015

(30) Foreign Application Priority Data

Nov. 5, 2013 (KR) ........................ 10-2013-0133681

(51) Int. Cl.

| | |
|---|---|
| ***G06F 17/00*** | (2006.01) |
| ***G10H 1/42*** | (2006.01) |
| ***G10H 7/02*** | (2006.01) |

(52) U.S. Cl.

CPC ................ *G10H 1/42* (2013.01); *G10H 7/02* (2013.01); *G10H 2220/096* (2013.01); *G10H 2220/126* (2013.01); *G10H 2250/641* (2013.01)

(58) Field of Classification Search

CPC ...... G10H 1/42; G10H 7/02; G10H 2220/096; G10H 2220/126; G10H 2250/641

See application file for complete search history.

(56) References Cited

U.S. PATENT DOCUMENTS 7,087,830 B2 * 8/2006 Kent .................... G10H 1/0066 84/645
2007/0261535 A1 11/2007 Sherwani et al.
2014/0068435 A1 * 3/2014 Miyajima ............. G06F 3/0482 715/716
2016/0048589 A1 * 2/2016 Modi ................ G06F 17/30761 463/25

* cited by examiner

*Primary Examiner* — Fan Tsang
*Assistant Examiner* — Eugene Zhao
(74) *Attorney, Agent, or Firm* — The Farrell Law Firm, P.C.

(57) ABSTRACT

A method for outputting a sound in an electronic device is provided. The method includes generating a loop module corresponding to a loop element; displaying the generated loop module; and outputting a sound included in the displayed loop module.

13 Claims, 9 Drawing Sheets

| BAR | 1 | | 2 | | 3 | | 4 | | 5 | | 6 | | 7 | | 8 | |
|---|---|---|---|---|---|---|---|---|---|---|---|---|---|---|---|---|
| TOOTH | 1 | 2 | 3 | 4 | 5 | 6 | 7 | 8 | 9 | 10 | 11 | 12 | 13 | 14 | 15 | 16 |
| BELL | | | | | | | | | | | | | | | | |

| BAR | 1 | | 2 | | 3 | | 4 | | 5 | | 6 | | 7 | | 8 | |
|---|---|---|---|---|---|---|---|---|---|---|---|---|---|---|---|---|
| TOOTH | 1 | 2 | 3 | 4 | 5 | 6 | 7 | 8 | 9 | 10 | 11 | 12 | 13 | 14 | 15 | 16 |
| TAM | | | | | | | | | | | | | | | | |

| BAR | 1 | | 2 | | 3 | | 4 | |
|---|---|---|---|---|---|---|---|---|
| TOOTH | 1 | 2 | 3 | 4 | 5 | 6 | 7 | 8 |
| KICK | | | | | | | | |

ELECTRONIC DEVICE AND METHOD FOR OUTPUTTING SOUNDS

PRIORITY

This application claims priority under 35 U.S.C. §119(a) to a Korean Patent Application filed in the Korean Intellectual Property Office on Nov. 5, 2013 and assigned Serial No. 10-2013-0133681, the entire content of which is incorporated herein by reference.

BACKGROUND

1. Field of the Invention

The present invention generally relates to an electronic device and method for outputting sounds.

2. Description of the Related Art

Applications in mobile electronic devices may include applications for generating sounds. Conventionally, in order to generate or output the sounds, loop elements may be mapped per unit time, using a sound table that is expressed as a plane having a horizontal time axis and a vertical loop element axis.

FIG. 1 illustrates a conventional sound table.

As illustrated in FIG. 1, the conventional sound table has a time axis (or an X-axis) and a loop element axis (or a Y-axis), and loop elements on the sound table may include at least one loop element such as a first instrument and a second instrument. For example, as illustrated, the loop elements may include a first percussion, a second percussion, a first bass, a second bass, a first string, a second string, a third string, and cymbals. These loop elements may simultaneously output their sounds per unit time (e.g., $t_1$).

However, this conventional sound table represents playback of the loop elements along the time axis simply in terms of function. If the number of loop elements increases and/or the length of a sound pattern increases, it may be complex for the user to watch the playback of the loop elements on one screen, and the monotonous and difficult user experience may be provided, causing the novice user to soon lose the interest.

Therefore, there is a need to provide a simple user experience by expressing the monotonous sound pattern to be more intuitive and to be more easily viewed.

SUMMARY

The present invention has been made to address at least the above-mentioned problems and/or disadvantages and to provide at least the advantages described below. Accordingly, an aspect of the present invention is to provide an electronic device and method for outputting sounds.

Another aspect of the present invention is to provide an electronic device and method for outputting or generating sounds.

In accordance with an aspect of the present invention, a method for outputting a sound in an electronic device is provided. The method includes generating a loop module corresponding to a loop element; displaying the generated loop module; and outputting a sound included in the displayed loop module.

In accordance with another aspect of the present invention, a method for outputting a sound in an electronic device is provided. The method includes generating at least one loop module corresponding to at least one loop element; displaying the generated at least one loop module; and outputting a sound included in the displayed at least one loop module in response to execution of one of the displayed at least one loop module.

In accordance with another aspect of the present invention, an electronic device for outputting a sound is provided. The electronic device includes a screen configured to receive a command to output a sound; a controller configured to generate a loop module taking into account a sound pattern of a loop element, and to generate a sound included in the loop module in response to execution of the generated loop module; and an output unit configured to output the generated sound. The screen displays the generated loop module.

BRIEF DESCRIPTION OF THE DRAWINGS

The above and other aspects, features and advantages of certain embodiments of the present invention will be more apparent from the following description, taken in conjunction with the accompanying drawings, in which.

Throughout the drawings, like reference numerals will be understood to refer to like parts, components, and structures.

DETAILED DESCRIPTION OF EMBODIMENTS OF THE PRESENT INVENTION

The following description with reference to the accompanying drawings is provided to assist in a comprehensive understanding of embodiments of the present invention as defined by the claims and their equivalents. It includes various specific details to assist in that understanding but these are to be regarded merely as examples. Accordingly, those of ordinary skilled in the art will recognize that various changes and modifications of the embodiments described herein can be made without departing from the scope and spirit of the present invention. In addition, descriptions of well-known functions and constructions may be omitted for clarity and conciseness.

The terms and words used in the following description and claims are not limited to the meanings in a dictionary, but are merely used to enable a clear and consistent understanding of the present invention. Accordingly, it should be apparent to those skilled in the art that the following description of embodiments of the present invention is provided for illustration purpose only and not for the purpose of limiting the present invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including, for example, tolerances, measurement error, measurement accuracy limitations and other factors known to those of skill in the art, may occur in amounts that do not preclude the effect that the characteristic was intended to provide.

Figure 1:
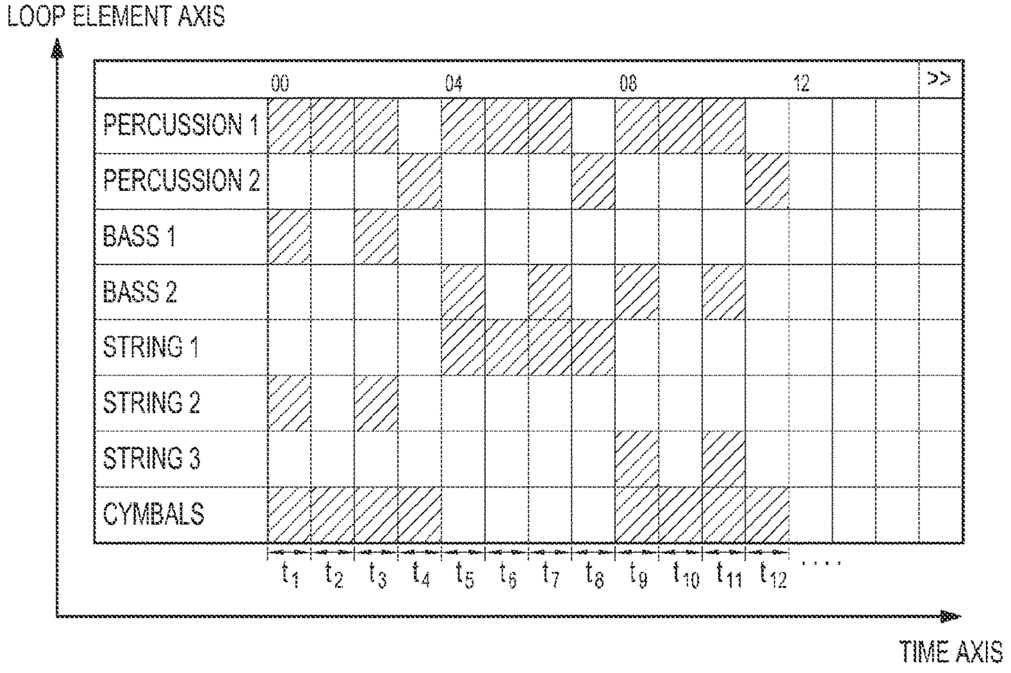
FIG.1 (PRIOR ART)
FIG. 1 illustrates a conventional sound table.
Figure 2:
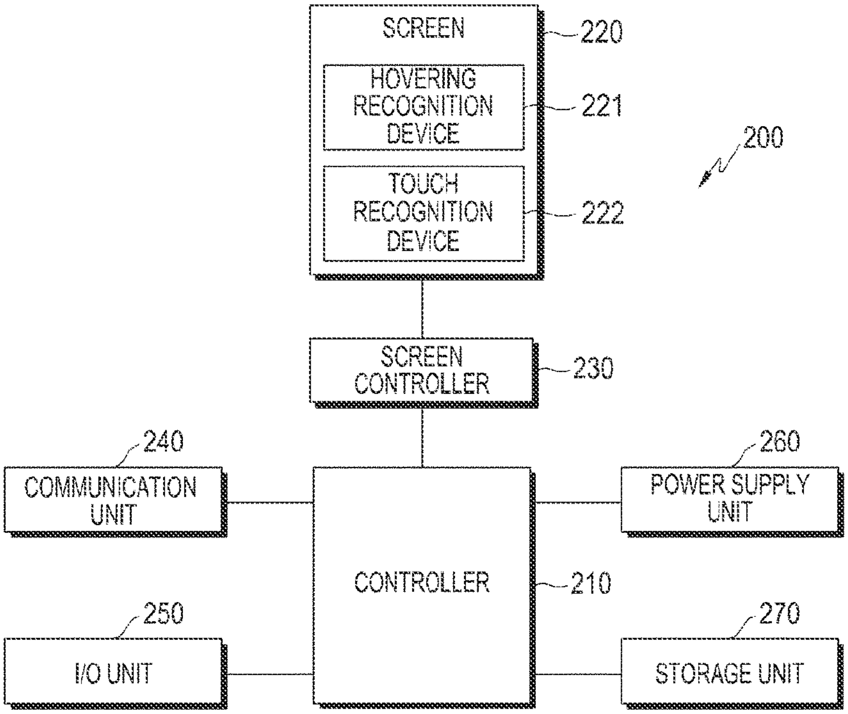
FIG. 2 illustrates a configuration of an electronic device according to an embodiment of the present invention.

FIG. 2 illustrates a configuration of an electronic device according to an embodiment of the present invention.

Referring to FIG. 2, an electronic device 200 may be connected to external devices using at least one of a communication unit 240, a connector, and earphone jack. The external devices may include various devices such as earphones, external speakers, Universal Serial Bus (USB) memories, chargers, cradles/docks, Digital Multimedia Broadcasting (DMB) antennas, mobile payment devices, healthcare devices (e.g., blood glucose meters, etc.), game consoles, car navigation devices, and the like, all of which can be detachably connected to the electronic device 200 by wires. The external devices may also include Bluetooth devices, Near Field Communication (NFC) devices, WiFi Direct devices, wireless Access Points (APs), and the like, all of which can be wirelessly connected to the electronic device 200. The electronic device 200 may be connected to other devices (e.g., mobile terminals, smart phones, tablet PCs, desktop PCs, digitizers, input devices, cameras, and servers) using wired or wireless connections.

Referring to FIG. 2, the electronic device 200 includes at least one screen 220 and at least one screen controller 230. The electronic device 200 may further include a controller 210 the communication unit 240, an Input/Output (I/O) unit 250, a power supply unit 260, and a storage unit 270.

An electronic device in the present invention may be a mobile terminal, which includes at least one screen, and each screen may display the results obtained by executing at least one application. The electronic device may include smart phones, tablet PCs, 3-Dimensional Televisions (3D-TVs), smart TVs, Light Emitting Diode (LED) TVs, Liquid Crystal Display (LCD) TVs, table PCs, and the like. The electronic device may also include all other devices that can communicate with peripheral devices or other terminals located in the remote places. At least one screen mounted on the electronic device may receive an input made by at least one of a touch and hovering.

The electronic device 200 includes at least one screen 220 that provides the user with user interfaces corresponding to various services (e.g., call, data transfer, broadcasting, photo shooting, string input, etc.). Each screen 220 includes a hovering recognition device 221 for recognizing a hovering input made by at least one of an input unit and a finger, and a touch recognition device 222 for recognizing a touch input made by at least one of a finger and an input unit. The hovering recognition device 221 and the touch recognition device 222 may also be referred to as a hovering recognition panel and a touch recognition panel, respectively. Each screen 220 sends an analog signal corresponding to at least one touch or hovering that is input to a user interface, to an associated screen controller. In this way, the electronic device 200 may have a plurality of screens 220, for each of which a screen controller for receiving an analog signal corresponding to a touch or hovering may be provided. Each screen 220 is coupled to each of a plurality of housings through hinge connection, or a plurality of screens 220 may be mounted on a single housing without hinge connection. The electronic device 200 according to an embodiment of the present invention may include at least one screen as described above, and for convenience of description, it will be assumed herein that the electronic device 200 has one screen. In addition, an input unit according to an embodiment of the present invention may include at least one of a finger, an electronic pen, a digital pen, a pen without an Integrated Circuit (IC), a pen with an IC, a pen with an IC and a memory, a pen capable of short-range communication, a pen with an additional ultrasonic detector, a pen with an optical sensor, a joystick, and a stylus pen, each of which can provide a command or an input to the electronic device when the input unit is in direct contact (e.g., touch) or indirect contact (e.g., hovering) with a digitizer.

A controller 210 may include a Central Processing Unit (CPU), a Read Only Memory (ROM) storing a control program for control of the electronic device 200, and a Random Access Memory (RAM) that temporarily stores the signals or data received from the outside of the electronic device 200, or that is used as a workspace for operations performed in the electronic device 200. The CPU may include a single-core processor, a dual-core processor, a triple-core processor, a quad-core processor, and the like.

The controller 210 controls at least one of the screen 220, the hovering recognition device 221, the touch recognition device 222, the screen controller 230, the communication unit 240, the I/O unit 250, the power supply unit 260, and the storage unit 270.

The controller 210 determines whether hovering is recognized as any one of the various input units that approaches any one object while various objects or input characters are displayed on the screen 220, and also identifies an object corresponding to the position where hovering has occurred. The controller 210 detects a height from the electronic device 200 (to be specific, the screen 220 of the electronic device 200) to the input unit, and a hovering input event associated with the height. The hovering input event may include at least one of an event that a button formed on the input unit is pressed, an event that the input unit is tapped, an event that the input unit moves faster than a predetermined speed, and an event that an object is touched.

In accordance with an embodiment of the present invention, the controller 210 generates a loop module corresponding to a sound table, displays the generated loop module on the screen 220, and outputs a sound included in the displayed loop module. The controller 210 generates a loop module corresponding to the sound table. The loop module according to an embodiment of the present invention includes a sound pattern corresponding to a sound pattern of a loop module included in the sound table. The loop element includes a variety of instruments that can be used to play music, such as percussions, winds, strings, brasses, cymbals, tambourines, beats, and the like. The sound pattern may refer to a pattern of the sound generated by these instruments. The sound table according to an embodiment of the present invention includes a sound pattern of the media that outputs the audible sound such as human voices and animal sounds, in addition to the sound pattern of these various instruments.

The controller 210 generates a loop module using at least one loop element included in the sound table. The loop module may be in any one of a toothed wheel type, a gear type, and a disc type. In addition to the toothed wheel-type module, the gear-type module and the disc-type module, the loop module according to an embodiment of the present invention may further include a visual module that can output a sound to the user in response to at least one loop element included in the sound table. The loop module according to an embodiment of the present invention may include at least one of a loop element included in the sound table, sound pattern information including at least one ON/OFF information indicating whether a sound per unit time of the loop element is output, trigger information indicating a point where a sound is output from the sound pattern information, bar (or measure) information indicating bars (or measures) of a sound corresponding to the loop element included in the sound table, and volume information of the sound. The loop module according to an embodiment of the present invention may further include a variety of information needed to generate or output a sound, in addition to the above-stated information. The loop element included in the loop module is displayed in the central region of the loop module, and includes the instrument type corresponding to the loop element or the information (e.g., instrument name, sound name, etc.) for allowing the user to recognize the sound type. The sound pattern information includes a pattern in which the instrument or sound corresponding to the loop element is output in sound at a unit time. For example, if the sound pattern information is ON, its associated sound is output, and if the sound pattern information is OFF, its associated sound is not output. The sound may be output periodically or aperiodically. The trigger information refers to a point where a sound is output if it meets with a sound pattern on a loop pattern. If rotation of the loop module starts, the controller 210 analyzes the trigger information and outputs a sound corresponding to the loop element starting from the trigger point (or at the trigger point). The controller 210 outputs a sound at the trigger point (or starting from the trigger point) in response to the rotation of the loop module. The loop module may be in any one of a toothed wheel type and a disc type, and may rotate clockwise or counterclockwise in response to a detection of a touch or hovering on a certain point of the loop module. When at least two adjacent loop modules are combined and displayed on the screen 220, if rotation of any one loop module occurs, the other loop module also rotates, outputting a sound corresponding to the loop element starting from the trigger point. A sound pattern corresponding to one rotation of the loop module and a size of the loop module are adjusted depending on the sound pattern's length, beats and bars of the loop element included in the sound table. A sound pattern that is output when the loop module rotates one time may be the same as a sound pattern of the loop element.

In accordance with another embodiment of the present invention, the controller 210 generates at least one loop module corresponding to at least one loop element included in a sound table, displays the generated at least one loop module, and outputs a sound included in the at least one loop module in response to execution of any one of the at least one loop module. The controller 210 generates at least one loop module corresponding to at least one loop element included in the sound table. For example, if the number of loop elements is n, the controller 210 generates and displays n loop modules. The at least one loop module may be in any one of a toothed wheel type, a gear type and a disc type, and in response to rotation of any one loop module, other loop modules may rotate. For example, if at least one loop module is in a toothed wheel type, the controller 210 determines the number of teeth of the toothed wheel, bars of the toothed wheel, and a sound pattern taking into account the beats of the sound of the at least one loop element, bars of the sound and the sound pattern, and adds the determination results to the loop module of the toothed wheel type. The controller 210 displays the generated at least one loop module. If the number of generated loop modules is at least two, the controller 210 configures the loop modules such that the loop modules may be connected to each other, such as the gear. The controller 210 may configure at least two loop modules, and may combine the at least two loop modules taking into account a sound pattern of a loop element corresponding to each loop module.

The controller 210 displays the configured at least one loop module on the screen 220. The controller 210 displays the generated at least one loop module. Through the displayed at least one loop module, the user may combine each loop module according to his/her own sound taste. If at least two loop modules are configured by the user, the controller 210 newly generates a sound corresponding thereto. If the number of displayed loop modules is at least two, the controller 210 combines the displayed at least two loop modules keeping the mutual organic relationship so that each loop module may output a sound in the same pattern as a sound pattern of a loop element corresponding to the loop module. In order for at least one loop element included in the sound table to output the same sound as the sound that is output per unit time, the controller 210 analyzes a trigger point included in each loop module, and combines each loop module to output the same sound, such as the gear.

In response to a detection of a touch or hovering on any one of the configured at least one loop module, the controller 210 rotates each of the configured at least one loop module clockwise or counterclockwise. The controller 210 may stop the execution of any loop module. The controller 210 outputs a sound included in at least one loop module in response to the execution of any one of the at least one loop module. The controller 210 adjusts the volume of the sound that is output by at least one loop module. The pattern of the sound output from the controller 210 may be the same as the pattern of the sound of at least one loop element included in the sound table. If at least one of rotation and movement of the loop module is changed, the controller 210 outputs a new sound by analyzing at least one loop module, the rotation and/or movement of which is changed, and the new sound may not be the same as that of the sound pattern of the loop element before at least one of the rotation and movement of the loop module is changed.

In this way, the controller 210 determines a trigger point of at least one loop module displayed on the screen 220, and outputs a sound associated with a sound pattern of a loop element corresponding to the at least one loop module starting from the determined trigger point (or at the trigger point). Upon detecting a command to rotate or move at least one loop module displayed on the screen 220, the controller 210 rotates or moves the loop module in response to the detection. In this way, if the rotation and/or movement of at least one loop module is changed, the controller 210 newly configures the at least one loop module so that it may have an organic relationship, such as the gear, with another loop module, in response to the change.

In according to yet another embodiment of the present invention, upon detecting a command that is input through the screen 220 to output a sound, the controller 210 generates a loop module taking into account a sound pattern of a loop element, generates a sound included in the loop module in response to the execution of the generated loop module, and outputs the generated sound through the I/O unit 250.

If at least two loop elements are included in the sound table according to yet another embodiment of the present invention, the controller 210 generates each loop module taking into account a sound pattern of each loop element, and combines the generated each loop module. The controller 210 combines the at least two loop modules so that the sound in the same pattern as a sound pattern of each loop element corresponding to the generated each loop module may be output. In response to rotation of any one loop module, the controller 210 combines each loop module so that the other loop module may rotate, such as the gear. The controller 210 generates a loop module in a toothed wheel type or a disc type, using the beats and bars of the sound included in the loop element. The controller 210 adjusts the size of the loop module in response to the beats and bars of the sound included in the loop element. If the loop module is in a toothed wheel type, the controller 210 adjusts the number of teeth of the toothed wheel in response to the beats and bars of the sound. The controller 210 generates each loop module, using at least one of sound pattern information including at least one ON/OFF information indicating whether a sound per unit time included in each loop element is output, trigger information indicating a point where a sound is output from the sound pattern information, bar information indicating bars of a sound corresponding to the loop element included in the sound table, and volume information of the sound. The controller 210 rotates each of the least one loop module clockwise or counterclockwise in response to a detection of a touch or hovering on any one of the displayed at least one loop module.

The controller 210 adjusts the output sound in response to at least one of a rotate command and a move command for the displayed loop module. The controller 210 generates a new sound in response to at least one of the rotate command and the move command for the display loop module, and outputs the generated sound. Upon detecting a command to adjust or change at least one of the rotation and movement of the loop module, the controller 210 displays the results on the screen 220 in response to the detection.

The screen 220 receives at least one direct/indirect touch input through a user's body (e.g., fingers including the thumb) or a touch input unit (e.g., a stylus pen, an electronic pen, etc.), the direct/indirect touch input being made to generate at least one loop module and output a sound by executing the generated at least one loop module. The screen 220 includes the hovering recognition device 221 and the touch recognition device 222, which may recognize an indirect touch input and a direct touch input, respectively, upon receiving a direct/indirect touch input through a pen such as a stylus pen and an electronic pen. The hovering recognition device 221 determines the distance between the pen and the screen 220 using magnetic fields, ultrasonic waves, optical information, or surface acoustic waves. The touch recognition device 222 detects the touched position using the charges that move in response to the touch. The touch recognition device 222 detects all types of touches that can cause static electricity, and also detects a touch that is made by an input unit such as a finger and a pen. The screen 220 sends an analog signal corresponding to at least one gesture to the screen controller 230.

In various embodiments of the present invention, the term 'touch' may include not only a direct touch (e.g., contact touch) between the screen 220 and the user's body or touch input unit, but also an indirect touch (e.g., noncontact touch or hovering) between the screen 220 and the user's body or touch input unit, with a detectable gap there between set to a predetermined value. The detectable gap of the screen 220 is subject to change depending on the performance or structure of the electronic device 200. For example, the screen 220 is configured to differently output the values (e.g., analog voltage/current values) detected by a touch event and a hovering event, making it possible to separately detect the touch event made by the contact touch between the screen 220 and the user's body or touch input unit and the hovering event made by the noncontact touch between the screen 220 and the user's body or touch input unit. In addition, the screen 220 differently outputs the detected value (e.g., a current value, etc.) depending on the distance between the screen 220 and the space where the hovering event occurs.

The hovering recognition device 221 or the touch recognition device 222 may be implemented in, for example, a resistive type, a capacitive type, an infrared type, or an acoustic wave type.

The hovering recognition device 221, for example, is an Electro Magnetic Resonance (EMR) touch panel, and includes an electromagnetic induction coil sensor having a grid structure in which a plurality of loop coils are arranged in a predetermined first direction and a second direction crossing the first direction, and an electronic signal processor for sequentially providing an Alternating Current (AC) signal having a predetermined frequency to each loop coil in the electromagnetic induction coil sensor. If an input unit with a built-in resonance circuit is present around the loop coils in the hovering recognition device 221, the magnetic field transmitted from the loop coils may cause a mutual electromagnetic induction-based current in the resonance circuit in the input unit. Based on the current, an induced magnetic field is generated from the coils constituting the resonance circuit in the input unit, and the hovering recognition device 221 detects the induced magnetic field from the loop coils which have received a signal, and detects a hovering position and a touch position of the input unit. The electronic device 200 also detects a height from the touch recognition device 222 to the pen tip of the input unit.

The touch recognition device 222, for example, is a capacitive touch panel, and is a panel coated with a dielectric, in which both sides of glass are coated with a thin metallic conductive material (e.g., Indium Tin Oxide (ITO), etc.), causing a current to flow over the surface of the glass, and in which charges can be stored. If the input unit (e.g., the user's finger or the pen) touches the surface of the touch recognition device 222, a predetermined amount of charges moves to the touched position due to the static electricity, and the touch recognition device 222 detects the touched position by recognizing the change in current due to the movement of the charges. The touch recognition device 222 detects all types of touches that can cause static electricity, and also detects a touch that is made by an input unit such as a finger and a pen.

The screen 220 includes at least two touch screen panels each capable of detecting a touch or hovering by the user's body and the touch input unit so that the screen 220 may sequentially or simultaneously receive the inputs by the user's body and the touch input unit. The at least two touch screen panels provide different output values to the screen controller 230, and the screen controller 230 differently recognizes the values that are input in the at least two touch screen panels, and determines whether the input from the screen 220 is an input by the user's body or an input by the touch input unit. The screen 220 displays at least one object or an input string.

More specifically, the screen 220 is formed in the structure, in which a touch panel for detecting an input by the finger or the input unit depending on the change in induced electromotive force and a panel for detecting a touch on the screen 220 by the finger or the input unit are sequentially stacked in close contact with each other or are partially spaced apart from each other. The screen 220 includes a plurality of pixels, and displays images on the pixels or handwritten information entered by the input unit or the finger on the pixels. The screen 220 may use an LCD panel, an Organic Light Emitting Diode (OLED) panel, an LED panel, and the like, as its display panel.

The screen 220 includes a plurality of sensors for detecting the position where the finger or the input unit is in contact with the surface of the screen 220, or where the finger or the input unit is put over the screen 220 in a predetermined distance. Each of the plurality of sensors is formed in a coil structure. In a sensor layer formed of the plurality of sensors, each of the sensors has a predetermined pattern, forming a plurality of electrode lines. Due to this structure, if the finger or the input unit is in contact with the screen 220, the touch recognition device 222 generates a detection signal, a waveform of which is changed due to the capacitance between the sensor layer and the input means, and the screen 220 sends the generated detection signal to the controller 210. The distance between the input unit and the hovering recognition device 221 is determined depending on the strength of the magnetic field formed by the coil.

The screen controller 230 converts an analog signal that is received in response to a string entered on the screen 220, into a digital signal (e.g., X and Y coordinates), and sends the digital signal to the controller 210. The controller 210 controls the screen 220 using the digital signal received from the screen controller 230. For example, the controller 210 selects or executes a shortcut icon or an object displayed on the screen 220 in response to a touch event or a hovering event. The screen controller 230 may be incorporated into the controller 210.

The screen controller 230 determines the distance between the screen 220 and the space where a hovering event occurs, by detecting a value (e.g., a current value, etc.) that is output from the screen 220, converts a value of the determined distance into a digital signal (e.g., Z coordinates), and provides the digital signal to the controller 210.

The communication unit 240 includes a mobile communication unit, a sub-communication unit, a Wireless Local Area Network (WLAN) unit and a short-range communication unit according to the communication scheme, the transmission distance, and the type of the data transmitted and received. The mobile communication unit, under control of the controller 210, connects the electronic device 200 to the external device by mobile communication using at least one or multiple antennas. The communication unit 240 receives various sound tables over an external server or the Internet. The mobile communication unit transmits and receives wireless signals for voice calls, video calls, Short Message Service (SMS) messages or Multimedia Messaging Service (MMS) messages, to/from cellular phones, smart phones, tablet PCs or other devices, a phone number of each of which is entered in the electronic device 200. The sub-communication unit includes at least one of a WLAN unit and a short-range communication unit. For example, the sub-communication unit includes any one or both of the WLAN unit and the short-range communication unit. The sub-communication unit exchanges a control signal with the input unit. The control signal exchanged between the electronic device 200 and the input unit includes at least one of a field for supplying power to the input unit, a field for detecting a touch or hovering between the input unit and the screen 220, a field for detecting an input (e.g., an event that a button mounted on the input unit is pressed), a field indicating an identifier of the input unit, and a field indicating the X and Y coordinates where the input unit is placed. The input unit sends a feedback signal for the control signal received from the electronic device 200, to the electronic device 200. The WLAN unit, under control of the controller 210, accesses the Internet in the place where the wireless AP is installed. The WLAN unit supports the WLAN standard IEEE802.11x defined by the Institute of Electrical and Electronics Engineers (IEEE). The short-range communication unit, under control of the controller 210, performs wireless short-range communication between the electronic device 200 and an image forming apparatus. The short-range communication scheme includes Bluetooth, Infrared Data Association (IrDA), WiFi-Direct, NFC, and the like.

Using at least one of the sub-communication unit and the WLAN unit, the controller 210 communicates with nearby communication devices or communication devices located in the remote places, receive various data such as images, emoticons, photos, and the like, over the Internet, and communicates with the input unit. The communication is achieved by transmission/reception of control signals.

The electronic device 200 may include at least one of the mobile communication unit, the WLAN unit and the short-range communication unit depending on its performance. The electronic device 200 may include a combination of the mobile communication unit, the WLAN unit and the short-range communication unit depending on its performance. In various embodiments of the present invention, at least one or a combination of the mobile communication unit, the WLAN unit, the screen and the short-range communication unit will be referred to as a "transceiver", and it is not limited thereto.

The I/O unit 250 includes at least one of multiple buttons, a microphone, a speaker, a vibration motor, a connector, a keypad, an earphone jack, and an input unit, but is not limited thereto. The I/O unit 250 outputs through the speaker the sound that is generated by at least one loop module generated or configured by the controller 210. A cursor control device, such as a mouse, a trackball, a joystick and cursor direction keys, is provided to control the movement of the cursor on the screen 220 through communication with the controller 210. In the I/O unit 250, the speaker outputs the sound corresponding to control of at least one page displayed on the screen 220, and the vibration motor also outputs the vibrations corresponding to control of at least one page displayed on the screen 220.

The power supply unit 260, under control of the controller 210, supplies power to one or multiple batteries mounted in the housing of the electronic device 200. The one or multiple batteries supply power to the electronic device 200. The power supply unit 260 may supply, to the electronic device 200, the power that is received from an external power source through a wired cable connected to the connector. The power supply unit 260 may supply, to the electronic device 200, the power that is wirelessly received from an external power source by wireless charging technology.

The storage unit 270, under control of the controller 210, stores the signals or data that are input/output in response to operations of the communication unit 240, a multimedia unit, the screen 220, and the I/O unit 250. The storage unit 270 stores a plurality of phone numbers and schedule information, and also stores applications and a control program for control of the electronic device 200 or the controller 210. The storage unit 270 stores at least one sound table, and also stores at least one loop module that is generated or configured by the controller 210. The storage unit 270 stores the sound that is output by the generated or configured at least one loop module. The storage unit 270 includes a non-volatile memory, a volatile memory, a Hard Disc Drive (HDD), or a Solid State Drive (SSD).

The storage unit 270 stores at least one of the characters, words and strings, which are input to the screen 220, and also stores various data such as the texts, images, emoticons, and icons, which are received over the Internet by the user. In addition, the storage unit 270 stores applications of various functions (e.g., navigation applications, video call applications, game applications, and time-based alarm applications), images for providing Graphical User Interfaces (GUIs) associated with the applications, user information, documents, databases or data associated with a method of handling touch inputs, background images (e.g., a menu screen, a standby screen, etc.) or operating programs needed to drive the electronic device 200, images captured by a camera unit, and the like. The storage unit 270 may be a machine (e.g., computer)-readable medium, and the term 'machine-readable medium' may be defined as a medium that provides data to a machine so that the machine may perform a specific function. The machine-readable medium may be storage media. The storage unit 270 may include non-volatile media and volatile media. All of these media should be the media configured such that commands carried on the media may be detected by the physical mechanism that reads the commands by machine.

Figure 3:
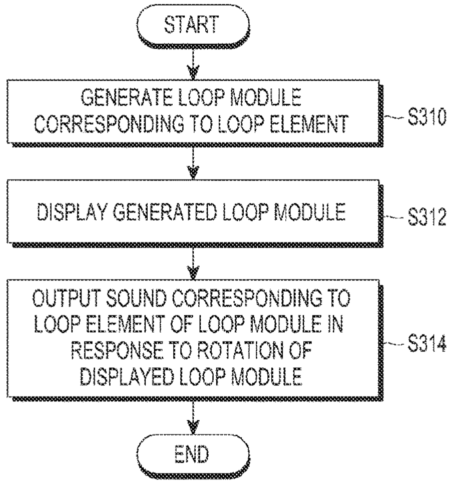
FIG. 3 is a flowchart illustrating a process of outputting a sound in an electronic device according to an embodiment of the present invention.

FIG. 3 is a flowchart illustrating a process of outputting a sound in an electronic device according to an embodiment of the present invention.

In step S310, the electronic device 200 generates a loop module corresponding to a loop element. The electronic device 200 generates at least one loop module using a loop element included in a sound table. The electronic device 200 may generate loop modules, the number of which is either greater than or less than the number of loop elements. The electronic device 200 may generate a loop module(s) depending on the user's selection of the number of loop modules. The loop module according to an embodiment of the present invention includes a sound pattern corresponding to a sound pattern of the loop element included in the sound table. The loop module includes at least one of a loop element included in a sound table, sound pattern information including at least one ON/OFF information indicating whether a sound per unit time of the loop element is output, trigger information indicating a point where a sound is output from the sound pattern information, bar information indicating bars of a sound corresponding to the loop element included in the sound table, and volume information of the sound. The loop element includes various instruments that can be used to play music, such as percussions, winds, strings, beats, and the like. The sound pattern refers to a pattern of the sound generated by these instruments. The sound table according to an embodiment of the present invention includes a sound pattern of the media that outputs the audible sound such as human voices and animal sounds, in addition to the sound pattern of these various instruments. The trigger information refers to a starting point where a sound is output from the sound pattern information. If a loop module starts, the electronic device 200 analyzes the trigger information and outputs a sound corresponding to the loop element through the I/O unit 250, starting from the trigger point (or at the trigger point). The electronic device 200 may output a sound of each loop module starting from each trigger point in response to rotation of at least one loop module. The bar information, which is information indicating bars of a sound, may be included in the generated loop module. In addition, the loop module may include volume information for adjusting the volume of the output sound, and at least one loop module may include a variety of information for providing functions of, for example, an equalizer and the like.

In step S312, the electronic device 200 displays the generated loop module. The electronic device 200 displays at least one loop module on the screen 220 depending on the number of loop elements included in the sound table. The loop module may be in any one of a toothed wheel type, a gear type, and a disc type. In addition to the toothed wheel-type module, the gear-type module and the disc-type module, the loop module according to an embodiment of the present invention may further include various visual modules that can output a sound to the user in response to at least one loop element included in the sound table. Each of the loop modules includes at least one of a loop element included in the sound table, sound pattern information including at least one ON/OFF information indicating whether a sound per unit time of the loop element is output, trigger information indicating a point where a sound is output from the sound pattern information, bar information indicating bars of a sound corresponding to the loop element included in the sound table, and volume information of the sound.

In step S314, the electronic device 200 outputs a sound corresponding to the loop element of the loop module in response to rotation of the displayed loop module. Upon detecting a command to rotate a loop module, the electronic device 200 determines a trigger point included in the loop module, and outputs a sound starting from the determined trigger point. Upon detecting a command to rotate any one loop module while at least two loop modules are displayed on the screen 220, the electronic device 200 determines a trigger point included in each loop module, and simultaneously outputs a sound starting from the determined each trigger point. The electronic device 200 mutes the sound output by any one or more loop modules while a plurality of loop modules are rotated. A sound pattern that is output when each loop module rotates one time may be the same as a sound pattern of the loop element corresponding to the loop module.

Figure 4:
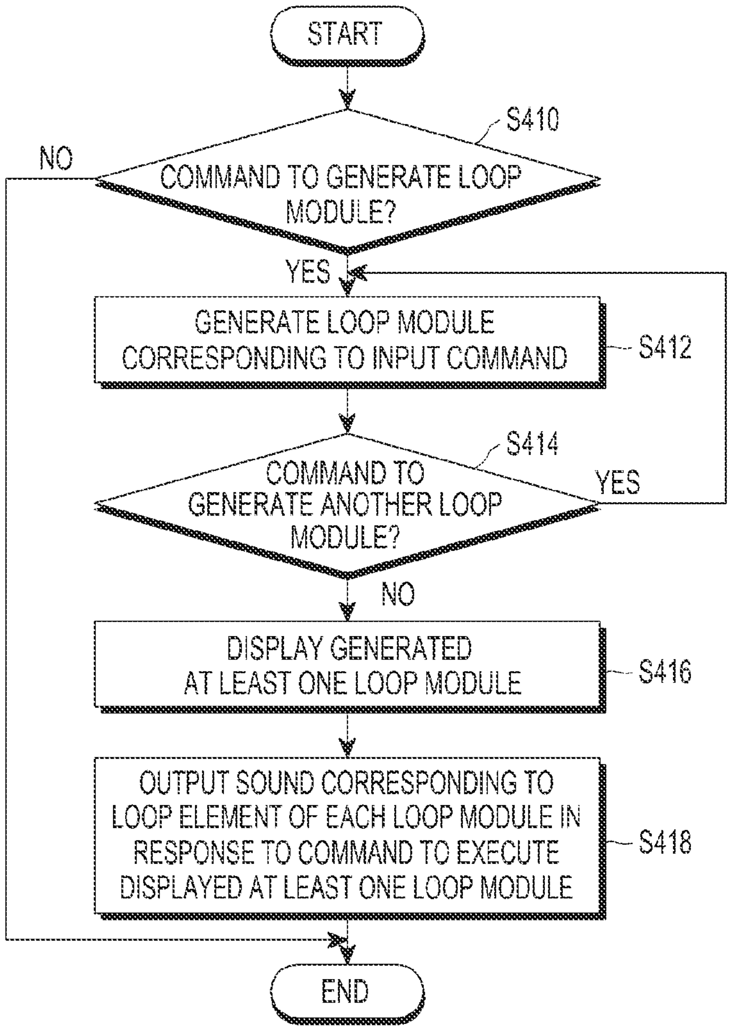
FIG. 4 is a flowchart illustrating a method of outputting a sound in an electronic device according to another embodiment of the present invention.

FIG. 4 is a flowchart illustrating a method of outputting a sound in an electronic device according to another embodiment of the present invention.

Upon receiving a command to generate a loop module in step S410, the electronic device 200 may generate a loop module in response to the received command in step S412. Upon receiving a command to generate a loop module, the electronic device 200 generates a loop module by executing an application for generating a loop module or by using a pre-stored sound table. This application may be pre-stored in the electronic device 200 to generate a loop module, or the electronic device 200 may use a pre-stored sound table to generate a loop module in response to a command received therein. Upon receiving a command through a sound table that can be displayed on the screen 220, the electronic device 200 generates at least one loop module using a loop element included in the sound table. The electronic device 200 may generate loop modules, the number of which is either greater than or less than the number of loop elements. The electronic device 200 may generate a loop module(s) depending on the user's selection of the number of loop modules. The loop module according to an embodiment of the present invention includes a sound pattern corresponding to a sound pattern of the loop element included in the sound table. The loop module includes at least one of a loop element included in a sound table, sound pattern information including at least one ON/OFF information indicating whether a sound per unit time of the loop element is output, trigger information indicating a point where a sound is output from the sound pattern information, bar information indicating bars of a sound corresponding to the loop element included in the sound table, and volume information of the sound. The loop element includes various instruments that can be used to play music, such as percussions, winds, strings, brasses, beats and the like. The sound pattern refers to a pattern of the sound generated by these instruments. The sound table according to an embodiment of the present invention includes a sound pattern of the media that outputs the audible sound such as human voices and animal sounds, in addition to the sound pattern of these various instruments. The trigger information refers to a starting point where a sound is output from the sound pattern information. If a loop module starts, the electronic device 200 analyzes the trigger information and outputs a sound corresponding to the loop element through the I/O unit 250, starting from the trigger point (or at the trigger point). The electronic device 200 outputs a sound of each loop module starting from each trigger point (or at the trigger point) in response to rotation of at least one loop module. The bar information, which is information indicating bars of a sound, may be included in the generated loop module. In addition, the loop module may include volume information for adjusting the volume of the output sound, and at least one loop module may include a variety of information for providing functions of, for example, an equalizer and the like.

Upon receiving a command to generate another loop module in step S414, the electronic device 200 generates a loop module corresponding to the received command in step S412. At least one of the size and bars of each loop module generated in step S412 is adjusted depending on the length of the sound pattern of the loop element. Through steps S410, S412 and S414, the electronic device 200 generates at least one loop module. Each of the at least one loop module may be in any one of a toothed wheel type, a gear type, and a disc type, and in response to rotation of one loop module, another loop module may rotate.

If a command to generate another loop module is not received in step S414, the electronic device 200 displays the generated at least one loop module in step S416. The electronic device 200 generates at least one loop module using at least one loop element included in the sound table, and displays the generated at least one loop module on the screen 220. The number of generated loop modules may be equal to, less than or greater than the number of loop elements included in the sound table. The number of loop modules may be adjusted by the user. The loop module may be in any one of a toothed wheel type, a gear type, and a disc type. In addition to the toothed wheel-type module, the gear-type module and the disc-type module, the loop module according to an embodiment of the present invention may further include various visual modules that can output a sound to the user in response to at least one loop element included in the sound table. The electronic device 200 may configure the generated at least one loop module. If there are at least two loop elements, the electronic device 200 combines at least two loop modules taking into account a sound pattern of a loop element corresponding to each loop module. Upon detecting a touch or hovering on any one of the configured at least one loop module, the electronic device 200 rotates each of the configured at least one loop module.

In step S418, the electronic device 200 outputs a sound corresponding to a loop element of each loop module in response to a command to execute the displayed at least one loop module. A pattern of the output sound may be the same as a pattern of the sound of at least one loop element included in the sound table. Upon detecting a command to rotate a loop module, the electronic device 200 determines a trigger point included in the loop module, and outputs a sound starting from the determined trigger point (or at the trigger point). Upon detecting a command to rotate any one loop module while at least two loop modules are displayed on the screen 220, the electronic device 200 determines a trigger point included in each loop module, and simultaneously outputs a sound starting from the determined each trigger point (or at the trigger point). The electronic device 200 may mute the sound output by any one or more loop modules while a plurality of loop modules are rotated. A sound pattern that is output when each loop module rotates one time may be the same as a sound pattern of the loop element corresponding to the loop module.

Figures 5A, 5B:
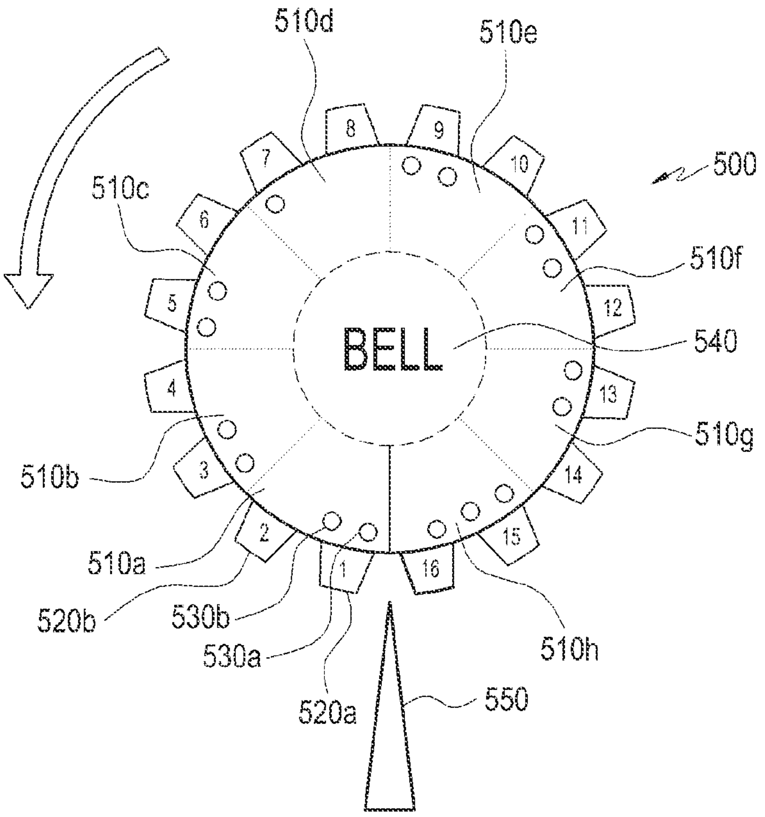
FIG. 5A illustrates a sound table when a loop element included in the sound table is a bell, according to an embodiment of the present invention.
FIG. 5B illustrates a loop module generated in response to a loop element (bell) included in a sound table according to an embodiment of the present invention.

FIGS. 5A and 5B illustrate a sound pattern of a loop element included in a sound table and a loop module corresponding thereto according to an embodiment of the present invention, respectively.

Specifically, FIG. 5A illustrates a sound table when a loop element included in the sound table is a bell, according to an embodiment of the present invention, and FIG. 5B illustrates a loop module generated in response to a loop element (bell) included in a sound table according to an embodiment of the present invention.

As illustrated in FIG. 5A, a sound pattern of a loop element (e.g., a bell) has a 1-round loop pattern of 8 bars in four-four (4/4) time. Each bar has two teeth, each tooth has two fields, and each field represents ON or OFF information. Each field may be defined as a unit time, and the unit times may be the same. If any field is set as ON, a sound corresponding to the bell is output at the unit time. If any field is set as OFF, a sound corresponding to the bell is not output at the unit time.

As illustrated in FIG. 5B, a loop module 500 in a toothed wheel type is generated using the sound table in FIG. 5A. The loop module 500 in a toothed wheel type is divided into a plurality of bars 510*a* to 510*h* in response to bars (e.g., 8 bars) of the sound table, and each bar of the loop module 500 includes two teeth. Each bar (e.g., 510*a*) of the loop module 500 includes at least one ON/OFF information (e.g., 530*a* and 530*b*). As for the loop module 500, if a command to rotate the loop module 500 is received, the loop module 500 rotates itself clockwise or counterclockwise. A region 540 displays a name (e.g., a bell) of the instrument corresponding to the loop element and also adjusts the volume, and its size is adjusted by the user's input before or during playback of the loop element. The volume is adjusted in response to the adjustment of the size. If the loop module 500 rotates, a sound is output in response to the ON/OFF information, starting from a trigger point 550. As for the loop module according to an embodiment of the present invention, if a touch/hovering-based command is received in any region other than the region 540, the loop module rotates clockwise or counterclockwise.

More specifically, since the loop module 500 in FIG. 5B represents two basic beats (or two basic beats or more or less) per tooth, the total number of teeth is proportional to the number of bars of a 1-round loop, and is inversely proportional to the length of the beat. When the sound pattern in FIG. 5A is in 4/4 time, the loop module 500 includes 4 beats in one bar in which the basic beat is one beat. One bar is expressed per two teeth and two basic beats are expressed per tooth. When the sound pattern is in eight-eight (8/8) time, since the loop module 500 includes 8 beats in one bar in which the basic beat is a half beat, one bar is expressed per four teeth and two half beats are expressed per tooth. For example, a 1-round loop of 8 bars in 4/4 time requires 16 teeth, while a 1-round loop of 8 bars in 8/8 time requires 32 teeth. As another example, a 1-round loop of 8 bars in 4/4 time requires 16 teeth, while a 1-round loop of 4 bars in 4/4 time requires 8 teeth.

If a command by the user's touch or hovering is detected, the loop module 500 in a toothed wheel type rotates around the region 540 clockwise or counterclockwise. If the loop module 500 rotates, a sound corresponding to a bell of the point 530*a* passing by the trigger point 550 is output. As illustrated, if the loop module 500 rotates counterclockwise, a sound is output twice in a first bar 510*a*, a sound is output twice in a second bar 510*b*, a sound is output twice in a third bar 510*c*, a sound is output once in a fourth bar 510*d*, a sound is output twice in a fifth bar 510*e*, a sound is output twice in a sixth bar 510*f*, a sound is output twice in a seventh bar 510*g*, and a sound is output three times in an eighth bar 510*h*.

Figures 6A, 6B:
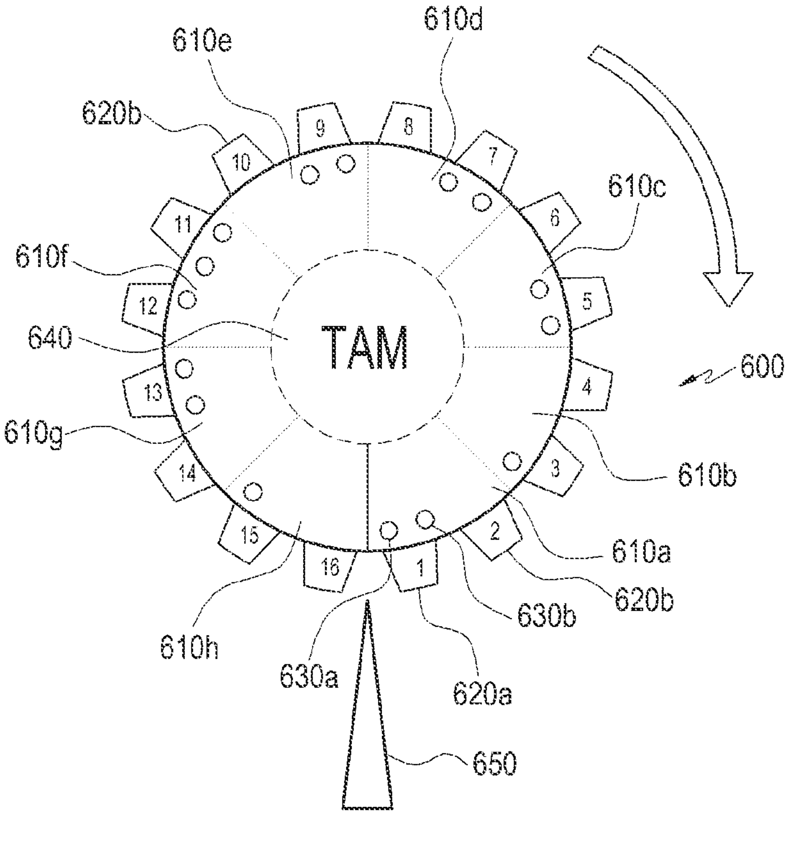
FIG. 6A illustrates a sound table when a loop element included in the sound table is a tambourine, according to another embodiment of the present invention.
FIG. 6B illustrates a loop module generated in response to a loop element (tambourine) included in a sound table according to another embodiment of the present invention.

FIGS. 6A and 6B illustrate a sound pattern of a loop element included in a sound table and a loop module corresponding thereto according to another embodiment of the present invention.

Specifically, FIG. 6A illustrates a sound table when a loop element included in the sound table is a tambourine, according to another embodiment of the present invention, and FIG. 6B illustrates a loop module generated in response to a loop element (tambourine) included in a sound table according to another embodiment of the present invention.

As illustrated in FIG. 6A, a sound pattern of a loop element (e.g., a tambourine) has a 1-round loop pattern of 8 bars in 4/4 time. Each bar has two teeth, each tooth has two fields, and each field represents ON or OFF information. Each field is defined as a unit time, and the unit times may be the same. If any field is set as ON, a sound corresponding to the tambourine is output at the unit time. If any field is set as OFF, a sound corresponding to the tambourine is not output at the unit time.

As illustrated in FIG. 6B, a loop module 600 in a toothed wheel type is generated using the sound table in FIG. 6A. The loop module 600 in a toothed wheel type is divided into a plurality of bars 610*a* to 610*h* in response to bars (e.g., 8 bars) of the sound table, and each bar of the loop module 600 includes two teeth, which correspond to the number of teeth of each bar in the sound table. Each bar (e.g., 610*a*) of the loop module 600 includes at least one ON/OFF information (e.g., 630*a* and 630*b*). As for the loop module 600, if a command to rotate the loop module 600 is received in a region 640 indicating the type of the loop element corresponding to the loop module 600, the loop module 600 rotates itself clockwise or counterclockwise. The region 640 displays a name (e.g., a tambourine) of the instrument corresponding to the loop element and also adjusts the volume, and its size is adjusted by the user's input before or during playback of the loop element. The volume is adjusted in response to the adjustment of the size. If the loop module 600 rotates, a sound is output in response to the ON/OFF information, starting from a trigger point 650. As for the loop module according to another embodiment of the present invention, if a touch/hovering-based command is received in any region other than the region 640, the loop module rotates clockwise or counterclockwise.

More specifically, since the loop module 600 in FIG. 6B represents two basic beats or more or less per tooth, the total number of teeth is proportional to the number of bars of a 1-round loop, and is inversely proportional to the length of the beat. When the sound pattern in FIG. 6A is in 4/4 time, the loop module 600 includes 4 beats in one bar in which the basic beat is one beat. One bar is expressed per two teeth and two basic beats are expressed per tooth. When the sound pattern is in 8/8 time, since the loop module 600 includes 8 beats in one bar in which the basic beat is a half beat, one bar is expressed per four teeth and two half beats are expressed per tooth. For example, a 1-round loop of 8 bars in 4/4 time requires 16 teeth, while a 1-round loop of 8 bars in 8/8 time requires 32 teeth. As another example, a 1-round loop of 8 bars in 4/4 time requires 16 teeth, while a 1-round loop of 4 bars in 4/4 time requires 8 teeth.

If a command by the user's touch or hovering is detected, the loop module 600 in a toothed wheel type rotates around the region 640 clockwise or counterclockwise. If the loop module 600 rotates, a sound corresponding to a tambourine of the point 630*a* passing by the trigger point 650 is output. As illustrated, if the loop module 600 rotates clockwise, a sound is output twice in a first bar 610*a*, a sound is output once in a second bar 610*b*, a sound is output twice in a third bar 610*c*, a sound is output twice in a fourth bar 610*d*, a sound is output twice in a fifth bar 610*e*, a sound is output three times in a sixth bar 610*f*, a sound is output twice in a seventh bar 610*g*, and a sound is output once in an eighth bar 610*h*.

Figures 7A, 7B:
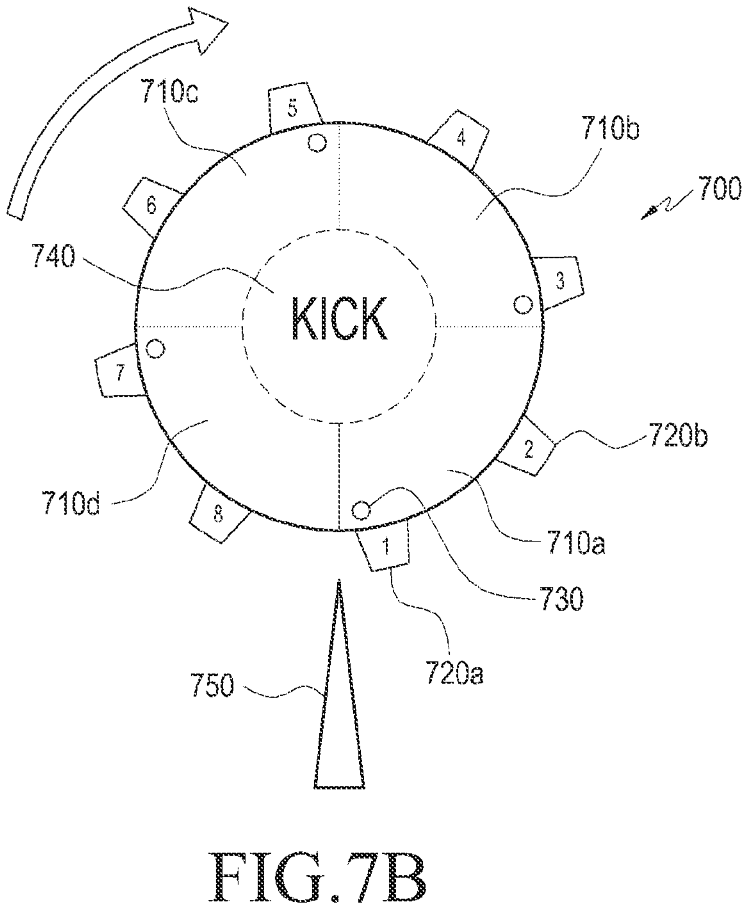
FIG. 7A illustrates a sound table when a loop element included in the sound table is a kick drum, according to yet another embodiment of the present invention.
FIG. 7B illustrates a loop module generated in response to a loop element (kick drum) included in a sound table according to yet another embodiment of the present invention.

FIGS. 7A and 7B illustrate a sound pattern of a loop element included in a sound table and a loop module corresponding thereto according to yet another embodiment of the present invention.

Specifically, FIG. 7A illustrates a sound table when a loop element included in the sound table is a kick drum, according to yet another embodiment of the present invention, and FIG. 7B illustrates a loop module generated in response to a loop element (kick drum) included in a sound table according to yet another embodiment of the present invention.

As illustrated in FIG. 7A, a sound pattern of a loop element (e.g., a kick drum) has a 1-round loop pattern of 4 bars in 4/4 time. Each bar has two teeth, each tooth has two fields, and each field represents ON or OFF information. Each field is defined as a unit time, and the unit times may be the same. If any field is set as ON, a sound corresponding to the kick drum is output at the unit time. If any field is set as OFF, a sound corresponding to the kick drum is not output at the unit time.

As illustrated in FIG. 7B, a loop module 700 in a toothed wheel type is generated using the sound table in FIG. 7A. The loop module 700 in a toothed wheel type is divided into a plurality of bars 710*a* to 710*d* in response to bars (e.g., 4 bars) of the sound table, and each bar of the loop module 700 includes two teeth, which correspond to the number of teeth of each bar in the sound table. Each bar (e.g., 710*a*) of the loop module 700 includes at least one ON/OFF information (e.g., 730). As for the loop module 700, if a command to rotate the loop module 700 is received in a region 740 indicating the type of the loop element corresponding to the loop module 700, the loop module 700 rotates itself clockwise or counterclockwise. The region 740 displays a name (e.g., a kick drum) of the instrument corresponding to the loop element and also adjusts the volume, and its size is adjusted by the user's input before or during playback of the loop element. The volume is adjusted in response to the adjustment of the size. If the loop module 700 rotates, a sound is output in response to the ON/OFF information, starting from a trigger point 750. As for the loop module according to a yet another embodiment of the present invention, if a touch/hovering-based command is received in any region other than the region 740, the loop module rotates clockwise or counterclockwise.

More specifically, since the loop module 700 in FIG. 7B represents two basic beats or more or less per tooth, the total number of teeth is proportional to the number of bars of a 1-round loop, and is inversely proportional to the length of the beat. The sound pattern in FIG. 7A is in 4/4 time, and has a loop pattern of 4 bars, and each bar is allocated two teeth.

If a command by the user's touch or hovering is detected, the loop module 700 in a toothed wheel type rotates around the region 740 clockwise or counterclockwise. If the loop module 700 rotates, a sound corresponding to a kick drum of the point 730 passing by the trigger point 750 is output. As illustrated, if the loop module 700 rotates clockwise, a sound is output once in a first bar 710*a*, a sound is output once in a second bar 710*b*, a sound is output once in a third bar 710*c*, and a sound is output once in a fourth bar 710*d*.

Figure 8A:
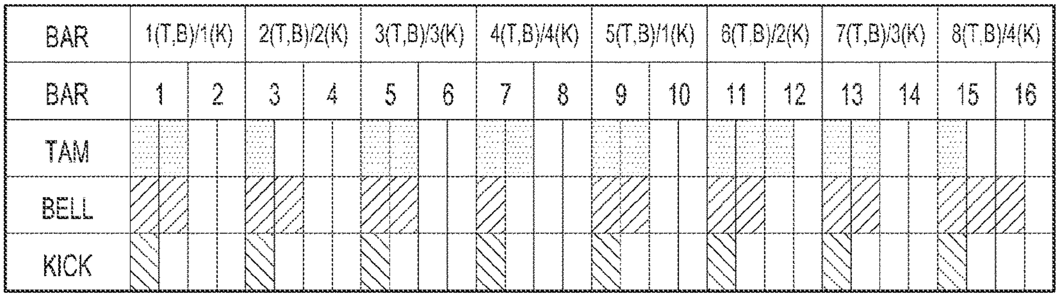
FIG. 8A illustrates a sound table of at least two loop elements included in the sound table according to an embodiment of the present invention.
Figure 8B:
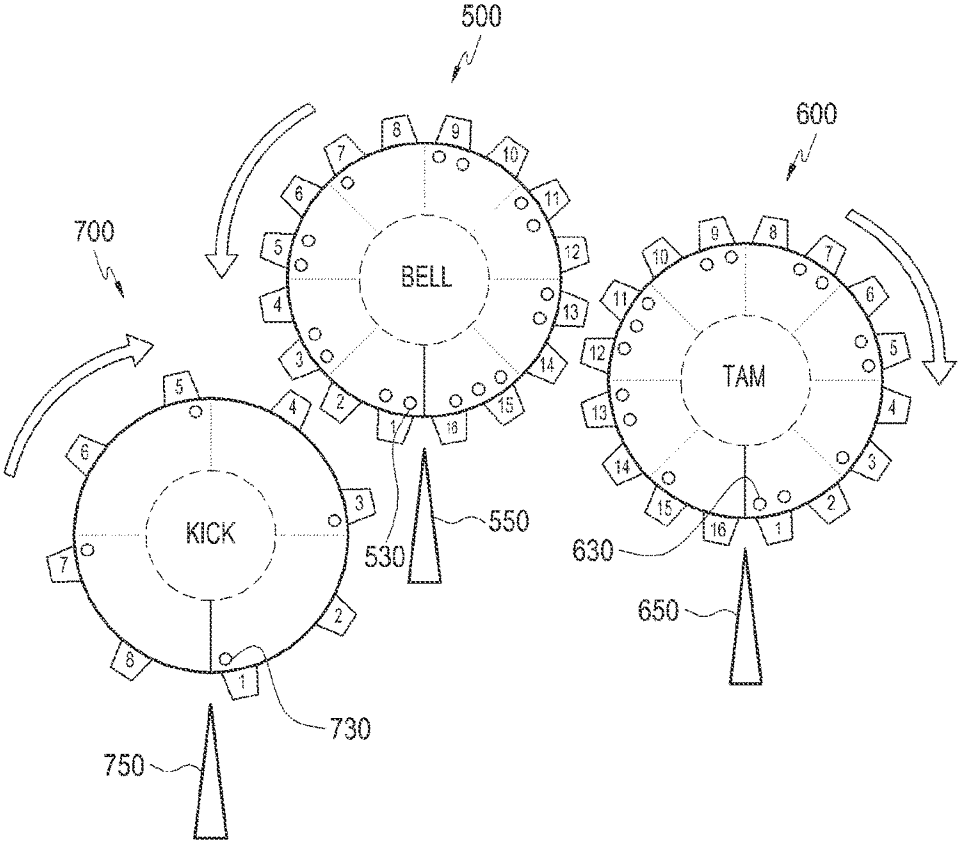
FIG. 8B illustrates an example of a combination of loop modules generated in response to at least two loop elements included in a sound table according to an embodiment of the present invention.

FIGS. 8A and 8B illustrate a sound pattern of at least two loop elements included in a sound table and at least two loop modules corresponding thereto according to an embodiment of the present invention.

Specifically, FIG. 8A illustrates a sound table of at least two loop elements included in the sound table according to an embodiment of the present invention, and FIG. 8B illustrates an example of combination of loop modules generated in response to at least two loop elements included in a sound table according to an embodiment of the present invention.

As illustrated in FIG. 8A, in a sound pattern of at least two loop elements (e.g., a tambourine, a bell and a kick drum), each of the loop module 600 corresponding to the tambourine and the loop module 500 corresponding to the bell has a 1-round sound pattern, and the loop module 700 corresponding to the kick drum has a 2-round sound pattern. For example, while the loop module 600 corresponding to the tambourine and the loop module 500 corresponding to the bell rotate once, the loop module 700 corresponding to the kick drum rotates twice. If the loop module 700 corresponding to the kick drum rotates clockwise, the loop module 500 corresponding to the bell rotates counterclockwise and the loop module 600 corresponding to the tambourine rotates clockwise in response to the loop module 500 corresponding to the bell. Sounds (e.g., 530, 630 and 730) corresponding to associated loop elements are output at trigger points (e.g., 550, 650 and 750), respectively.

Figure 9:
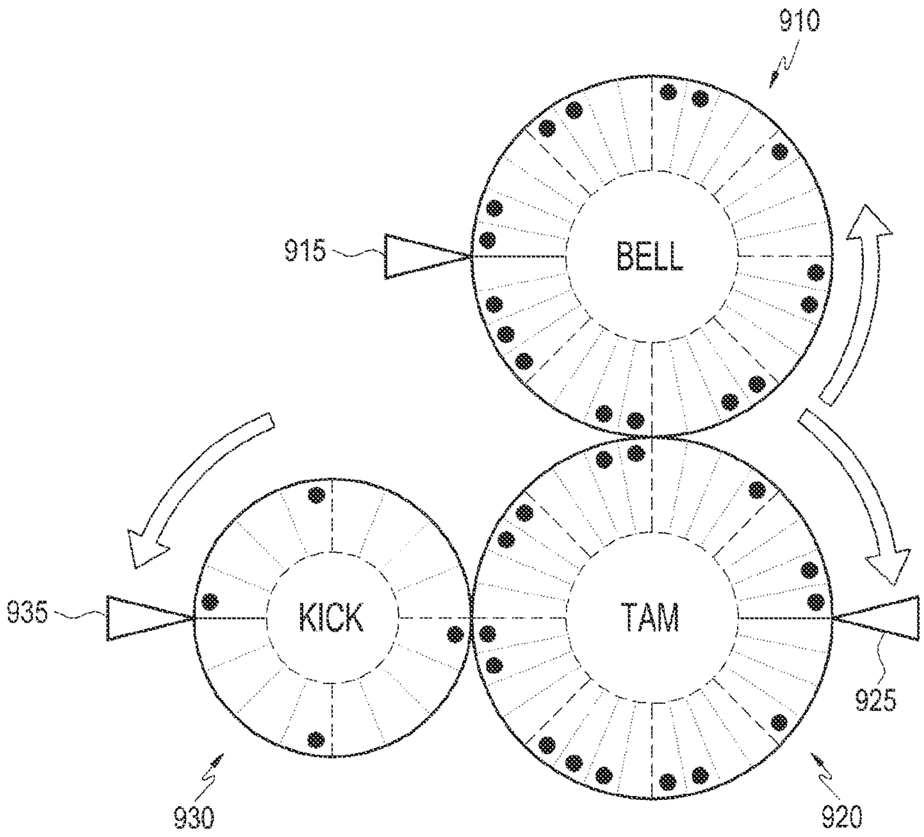
FIG. 9 illustrates another example of a combination of loop modules generated in response to at least two loop elements included in a sound table according to another embodiment of the present invention.

FIG. 9 illustrates another example of combination of loop modules generated in response to at least two loop elements included in a sound table according to another embodiment of the present invention.

As illustrated in FIG. 9, at least one loop module according to another embodiment of the present invention may be expressed in a disc type. As for each of these loop modules, its areas are formed taking into account the beat length and the bars of the loop element, and playback of a 1-round loop element is expressed per divided unit area. Since each of a loop module 920 corresponding to a tambourine and a loop module 910 corresponding to a bell has 8 bars in 4/4 time, each of the loop module 920 and the loop module 910 requires 4 areas per bar, a total of 32 divided areas. Since a loop module 930 corresponding to a kick drum has 4 bars in 4/4 time, the loop module 930 requires a total of 16 divided areas. A sound pattern in each area is matched to a sound pattern in the sound table. As at least two disc-type loop modules are be combined, such as the gear, sounds are output starting from associated trigger points 915, 925 and 935. If any one of the three loop modules is selected or rotated, the other two loop modules rotate in response to the rotation of the selected loop module. For example, if the loop module 930 corresponding to the kick drum rotates counterclockwise, the loop module 920 corresponding to the tambourine rotates clockwise and the loop module 910 corresponding to the bell rotates counterclockwise. For each of these loop modules, sound pattern information for outputting a sound is formed on its circular girth, and a sound is output based on the sound pattern information positioned at each trigger point. Besides, each loop module may either rotate or move.

It can be appreciated that embodiments of the present invention may be implemented by hardware, software, or a combination thereof. The software may be stored in a volatile or non-volatile storage (e.g., an erasable/re-writable ROM), a memory (e.g., a RAM, a memory chip, a memory device, a memory IC, and the like), or an optically/magnetically recordable machine (e.g., computer)-readable storage medium (e.g., Compact Disc (CD), Digital Versatile Disc (DVD), magnetic disc, magnetic tape, and the like). It can be noted that a storage unit that can be mounted in an electronic device may be an example of a machine-readable storage medium suitable to store a program or programs including instructions for implementing embodiments of the present invention. Therefore, the present invention may include a program including a code for implementing the apparatus and method defined by the appended claims and a machine-readable storage medium storing the program. This program may be electronically carried on any media such as communication signals that are transmitted through wired/wireless connections.

The electronic device may receive and store the program from a program server to which the electronic device is connected by wires or wirelessly. The program server may include a memory for storing a program including instructions for implementing the method of outputting a sound by the electronic device, and also storing the information necessary for the sound outputting method, a communication unit for performing wired/wireless communication with the electronic device, and a controller for transmitting the program to the electronic device automatically or at the request of the electronic device.

As is apparent from the foregoing description, an aspect of an embodiment of the present invention may generate a loop module corresponding to a sound table, display the generated loop module, and output a sound included in the displayed loop module, thereby providing a simple user experience that the user can more easily understand.

An aspect of another embodiment of the present invention may generate at least one loop module corresponding to at least one loop element included in a sound table, configure the generated at least one loop module, and output a sound included in the at least one loop module in response to execution of any one of the at least one loop module, thereby intuitively express the loop pattern.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for outputting a sound in an electronic device, the method comprising:

generating, by a processor of the electronic device, at least one loop module corresponding to at least one loop element;

displaying, by the processor, the generated at least one loop module on a screen of the electronic device; and outputting, by the processor, a sound included in the displayed at least one loop module in response to execution of one of the displayed at least one loop module, by an output unit of the electronic device, combining by the processor and displaying, if there are at least two loop elements, at least two loop modules corresponding to the at least two loop elements based on a sound pattern of each loop element corresponding to each loop module.

2. The method of claim 1, wherein if the one of the at least one loop module rotates, another loop module rotates in response to the rotation of the at least one loop module.

3. The method of claim 1, wherein each loop module among the at least two loop modules is combined with an adjacent loop module so that the sound in a same sound pattern is output, and the combined loop modules are displayed.

4. The method of claim 3, wherein the displayed at least one loop module is changeable in at least one of rotation and movement.

5. The method of claim 1, wherein, in response to detecting a touch or hovering on the one of the displayed at least one loop module, each of the displayed at least one loop module rotates clockwise or counterclockwise.

6. The method of claim 1, wherein the at least one loop module outputs the sound at a trigger point in response to the sound pattern of the loop element corresponding thereto.

7. The method of claim 1, wherein each loop module includes at least one of the loop element included in a sound table, sound pattern information including at least one ON/OFF information indicating whether a sound per unit time of the loop element is output, trigger information indicating a point where the sound is output from the sound pattern information, bar information indicating bars of the sound corresponding to the loop element included in the sound table, and volume information of the sound per unit time of the loop element.

8. The method of claim 1, wherein if the at least one loop module is a toothed wheel type, a number of teeth of the toothed wheel, bars of the toothed wheel, and the sound pattern are determined in response to beats of the sound, bars of the sound, and the sound pattern of the at least one loop element, respectively.

9. An electronic device for outputting a sound, the electronic device comprising:

a screen configured to receive a command to output a sound;

a processor configured to generate at least one loop module based on a sound pattern of at least one loop element, and to generate a sound included in the loop module in response to execution of the generated loop module; and an output unit configured to output the generated sound;

wherein the screen displays the generated loop module, and if there are at least two loop elements, the processor is further configured to generate each loop module based on a sound pattern of each loop element, and to combine each loop module.

10. The electronic device of claim 9, wherein the processor is further configured to combine at least two loop modules so that the sound is output in a same sound pattern.

11. The electronic device of claim 9, wherein the processor is further configured to generate the loop module using beats and bars of the sound included in the loop element.

12. The electronic device of claim 9, wherein the processor is further configured to rotate the loop module clockwise or counterclockwise in response to detecting a touch or hovering on the displayed loop module.

13. The electronic device of claim 9, wherein the processor is further configured to generate the loop module using at least one of the loop element included in a sound table, sound pattern information including at least one ON/OFF information indicating whether sound per unit time of the loop element is output, trigger information indicating a point where the sound is output from the sound pattern information, bar information indicating bars of the sound corresponding to the loop element included in the sound table, and volume information of the sound per unit time of the loop element.

* * * * *